United States Patent [19]
Chang

[11] Patent Number: 6,105,570
[45] Date of Patent: Aug. 22, 2000

[54] SOLAR POWER HEATING SYSTEM

[76] Inventor: Wu-hsiung Chang, No. 1025-5, Chung San Rd., Shankang Hsiang, Taichung Hsien, Taiwan

[21] Appl. No.: 09/258,803

[22] Filed: Feb. 26, 1999

[51] Int. Cl.[7] .................................................. F24J 2/016
[52] U.S. Cl. ...................... 126/655; 126/657; 126/663; 126/698; 126/709
[58] Field of Search .................... 126/623, 634, 126/638, 639, 655, 657, 663, 698, 648, 709

[56] References Cited

U.S. PATENT DOCUMENTS

| | | | |
|---|---|---|---|
| 4,150,660 | 4/1979 | Peters et al. | 126/623 |
| 4,215,675 | 8/1980 | Embreee | 126/623 |
| 4,257,398 | 3/1981 | Watson | 126/663 |
| 4,278,072 | 7/1981 | Ryan et al. | 126/623 |
| 4,338,921 | 7/1982 | Harder et al. | 126/623 |
| 4,706,650 | 11/1987 | Matzkanin | 126/638 |

FOREIGN PATENT DOCUMENTS

| | | | |
|---|---|---|---|
| 57-98756 | 6/1982 | Japan | 126/639 |
| 59-134457 | 8/1984 | Japan | 126/638 |
| 2269661 | 2/1994 | United Kingdom | 126/634 |

*Primary Examiner*—Ira S. Lazarus
*Assistant Examiner*—Sara Clarke
*Attorney, Agent, or Firm*—Rosenberg, Klein & Lee

[57] ABSTRACT

A solar power heating system includes a plurality of concentrating solar collectors each comprising a frame having two side walls and a reflecting layer attached to the inside thereof. Each of the side walls has two engaging members so as to conveniently connect with others. An isolating block is received between the two side walls and a circulating tube is engaged in the isolating block with a section of the circulating tube being exposed from the top of the isolating block. An absorbing layer is attached to the top of the isolating block and the section of the circulating tube. A lens device is connected between the two side walls so that water flowing through the circulating tube is heated by the absorbing layer. A heat exchanging device is connected to concentrating solar collectors.

11 Claims, 13 Drawing Sheets

SOLAR POWER HEATING SYSTEM

FIELD OF THE INVENTION

The present invention relates to a solar powered heating system comprising a plurality of concentrating solar collectors and connecting means for connecting the collectors with each other.

BACKGROUND OF THE INVENTION

A conventional home-use solar power system for heating water by solar energy is shown in FIGS. 11 and 12. The solar system generally includes a frame 92 which is fixedly connected to the top of a house and two solar panels 90 are supported on frame 92 with a tank 91 mounted to the higher end of the two solar panels 90. Each of solar panels 90 includes a heat absorber plate 900 and a plurality of supply pipes 901 and return pipes 903, respectively connected to the two ends of the heat absorber plate 900. Between the supply pipe 901 and the return pipe 903, a plurality of collector tubes 902 are connected so that cold water enters from supply pipe 902 and is heated during passage through the collector tubes 902, flows to tank 91, and is ready for use. The solar panels 90 each have a large size so that the frame 92 has to be large enough to support solar panels 90, and both the frame 92 and the solar panels 90 are so heavy that it is difficult to move them up to the top of the house. Furthermore, the pipes 901, 903 and the tubes 902 are connected with each other by soldering so that when one of the pipes 901, 903 of tubes 902 are broken, it is impossible to change just a single pipe. FIG. 13 shows another type of conventional solar power system which is only available for a house located in the proper orientation. That is, the angle of the solar panels 90 on the top of the house makes most of the sunshine on the solar panels 90. All of the inherent shortcomings in the solar power system shown in FIGS. 11 and 12 still exist.

The present invention provides a solar powered heating system which can be conveniently assembled by a connecting means so that the users may assemble the concentrating solar collectors according to their needs. The concentrating solar collector of the present invention has a compact size and is suitable to be assembled by the user himself.

SUMMARY OF THE INVENTION

In accordance with one aspect of the present invention, there is provided a solar powered heating system comprising a plurality of concentrating solar collectors, each comprising a frame with two side walls and each of the side walls having a reflecting layer attached to the inside thereof. An isolating block is received between the two side walls and a circulating tube is engaged in the isolating block with a section of the circulating tube being exposed from the top of the isolating block. An absorbing layer is attached to the top of the isolating block and the section of the circulating tube. A lens means is connected between the two side walls. A heat exchanging means is connected to the concentrating solar collectors and has an outer tube and an inner tube. The inner tube communicates with a supply pipe and the outer tube communicates with the circulating tubes.

The object of the present invention is to provide a solar power system whose concentrating solar collectors are conveniently connected with each other.

Another object of the present invention is to provide a solar power system wherein the size of the system can be predetermined by the number of concentrating solar collectors employed.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
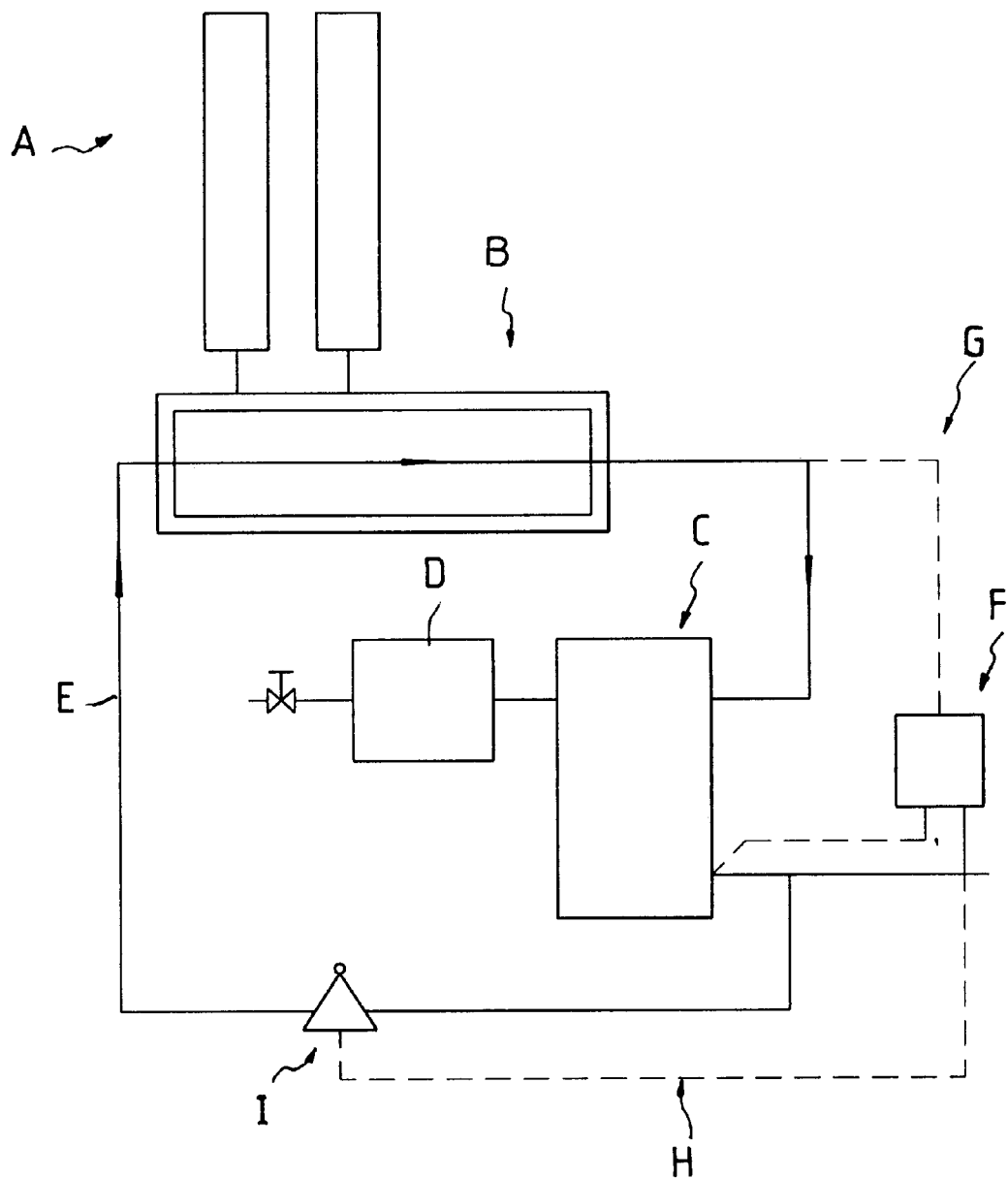
FIG. 1 is a simplified diagram to show the solar power system in accordance with the present invention.

Referring to FIG. 1, a solar power system of the present invention comprises two sets of concentrating solar collectors "A" connected to the heat exchanging means "B" through which cold water enters and absorbs heat and flows out from the heat exchanging means "B". Two hot water tanks "C", "D" are connected to the pipe extending from the heat exchanging means "B". A hot-water differential thermostat "F" is connected to the detecting pipe "G" which is connected to the pipe extending from the heat exchanging means "B". A pump "I" is connected to the pipe supplying the cold water into the heat exchanging means "B" and connected to the hot-water differential thermostat "F" by a control line "H".

Figure 2:
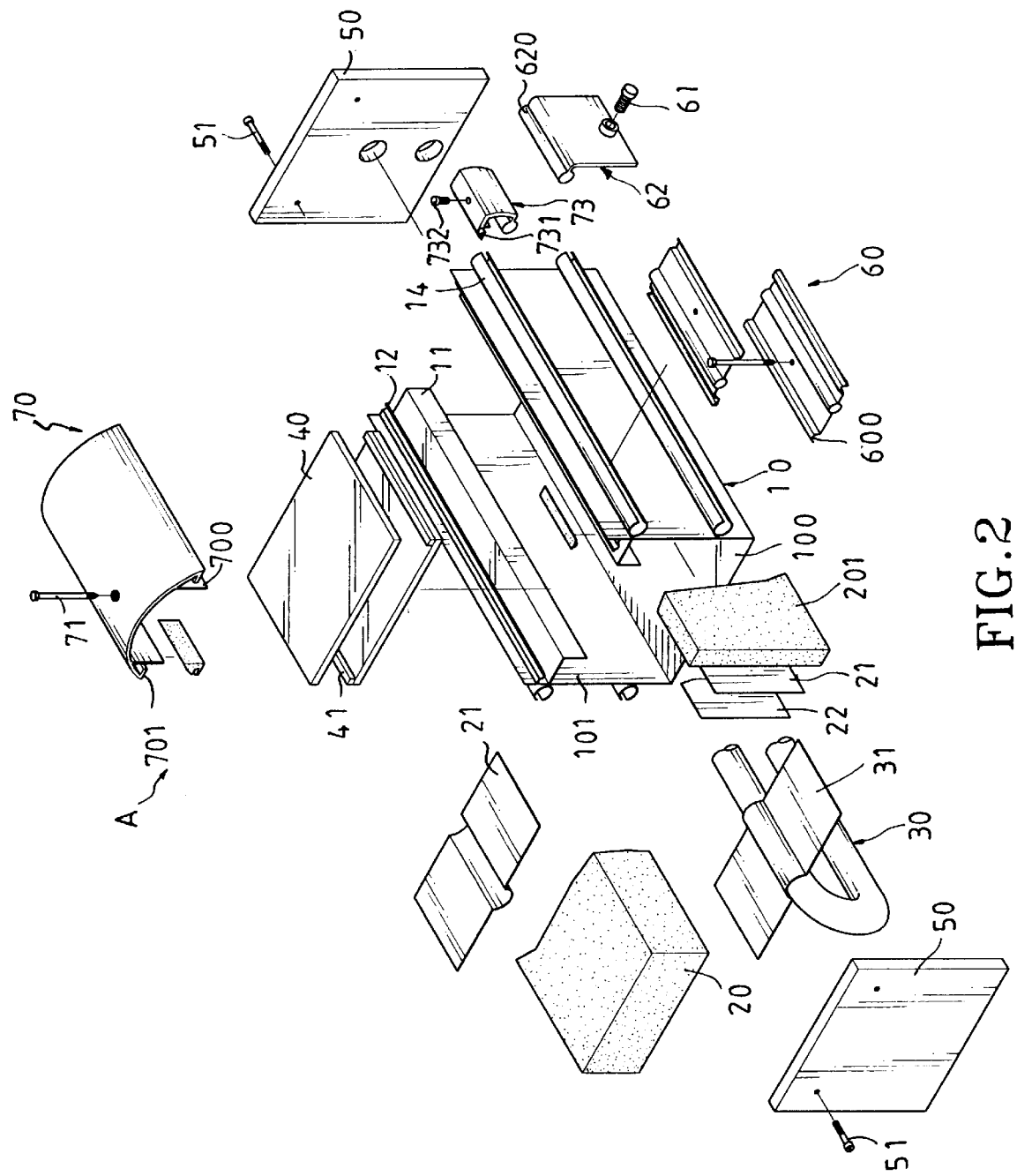
FIG. 2 is an exploded view of the concentrating solar collector in accordance with the present invention.
Figure 3:
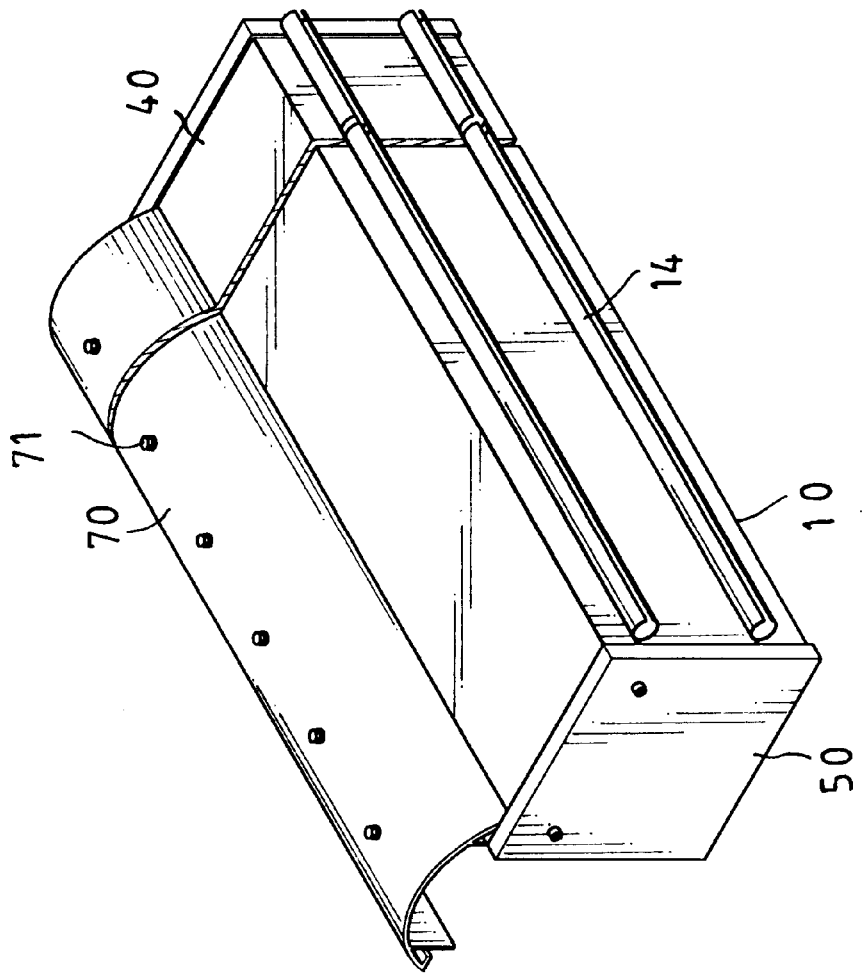
FIG. 3 is a perspective view of the concentrating solar collector in accordance with the present invention.
Figure 4:
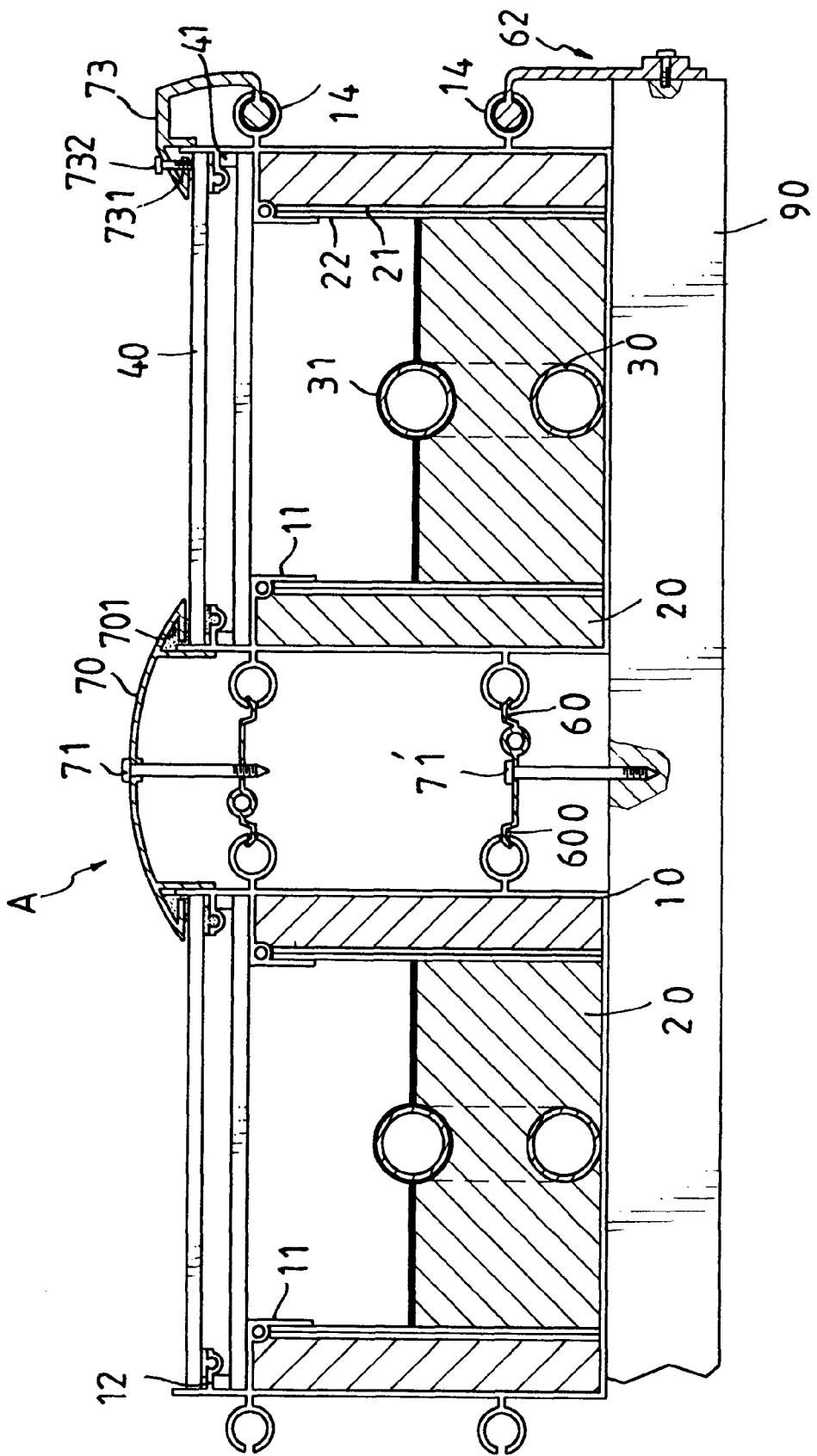
FIG. 4 is a side elevational view, partly in section, of two concentrating solar collectors connected with each other.

Referring to FIGS. 2 to 4, each of the concentrating solar collectors "A" comprises a frame 10 having a bottom 100 and two side walls 101 respectively extending from the bottom 100. Each of the side walls 101 has a flange 11 extending laterally inward from the inside thereof and each flange 11 has a horizontal portion and a vertical portion. An isolating plate 201 is received between each of the side walls 101 and the vertical portion of the flange 11. Each of the isolating plates 201 has a reflecting layer 22 attached thereto which faces the absorbing layer 31. A heat isolating plate 21 is received between each of the isolating plates 201 and the reflecting layer 22. Each of the side walls 101 has two C-shaped tubular engaging members 14 extending outward from the outside thereof so that the concentrating solar collectors "A" can be connected with each other by the engaging members 14. Two end boards 50 are respectively connected to the two ends of the frame 10 by bolts 51.

An isolating block 20 is received between the two side walls 101 and a U-shaped circulating tube 30 is engaged in the isolating block 20 with a section of the circulating tube 30 being exposed from the top of the isolating block 20. An absorbing layer 31 is attached to the top of the isolating block 20 and the section of the circulating tube 30. A lens means is connected between the two side walls 101 and includes two transparent plates 40 wherein two bars 41 are connected between the two transparent plates 40 so that a gap is defined between the two transparent plates 40. Sunlight passes through the lens means and then the energy of the sunlight is absorbed by the absorbing layer 31. Sunlight is also reflected from the reflecting layers 22 to the absorbing layer 31. It is to be noted that each of the side walls 101 has a horizontal supporting plate 12 located above the corresponding flange 11 so that the upper transparent plate 40 is supported on the two horizontal supporting plates 12 of the two side walls 101 and the lower transparent plate 40 is supported by the two flanges 11.

Figure 5:
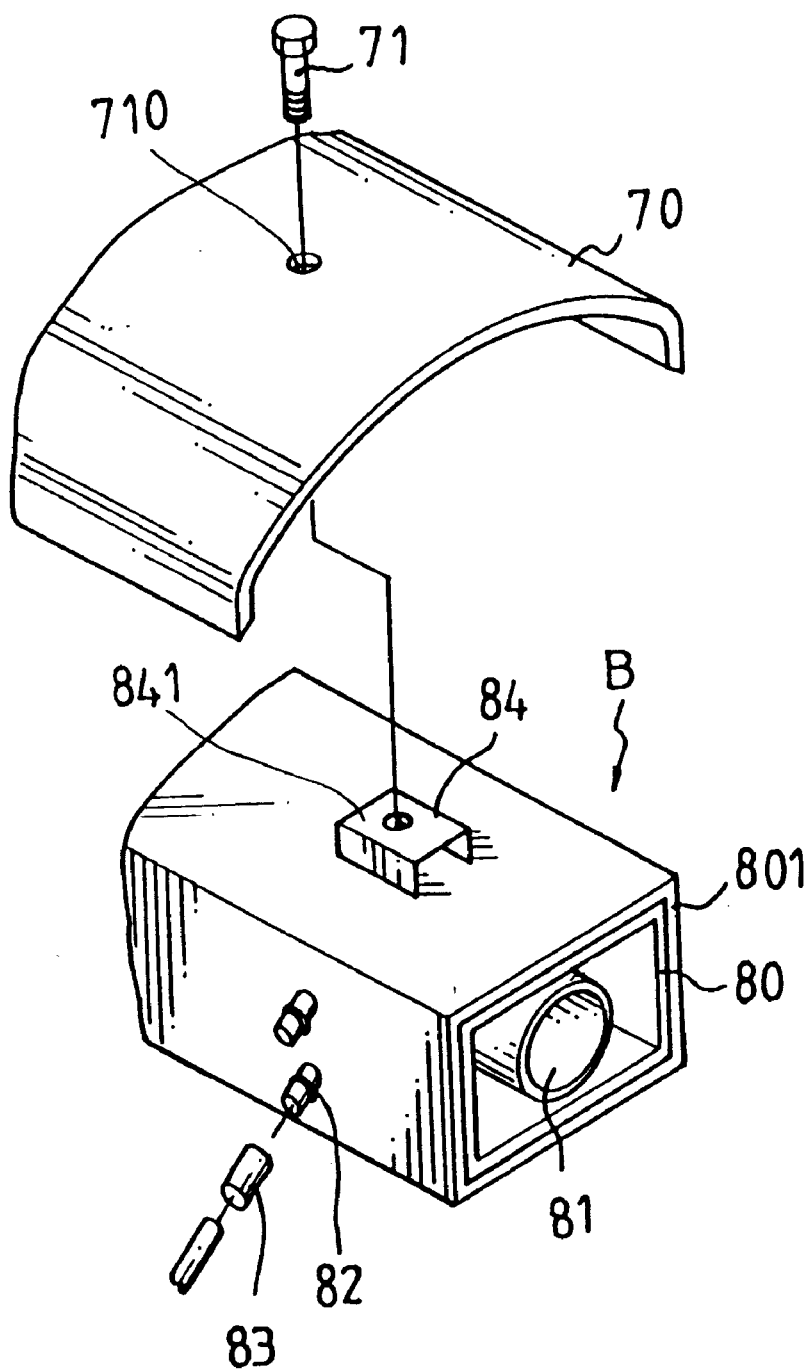
FIG. 5 is an exploded view of the heat exchanging means and a bridge member in accordance with the present invention.

Referring to FIG. 5, the heat exchanging means "B" is connected to the concentrating solar collectors "A" and has an outer tube 80 and an inner tube 81 which communicates with a supply pipe "E". The outer tube 80 communicates with the circulating tubes 30 by the fitting 82 extending from the outer tube 80 and the pipe 83 connected between the fitting 82 and the circulating tubes 30. A bridge member 70 has two ridges 700, as shown in FIG. 2, extending from the underside thereof and each of the two ridges 700 is engaged with the outside of one of the two side walls 101 of two of the adjacent concentrating solar collectors "A", as shown in FIG. 4. The bridge member 70 further has a transverse plate 701 extending inwardly from each of the two sides thereof so as to press on the lens means of each of the two adjacent concentrating solar collectors "A". The heat exchanging means "B" has an inverted U-shaped member 84 attached to the top thereof and a hole 841 defined in the top of the inverted U-shaped member 84. The bridge member 70 has an aperture 710 defined therethrough for a bolt 71 extending through the aperture 710 and engaged with the hole 841 of the heat exchanging means "B".

Figure 6:
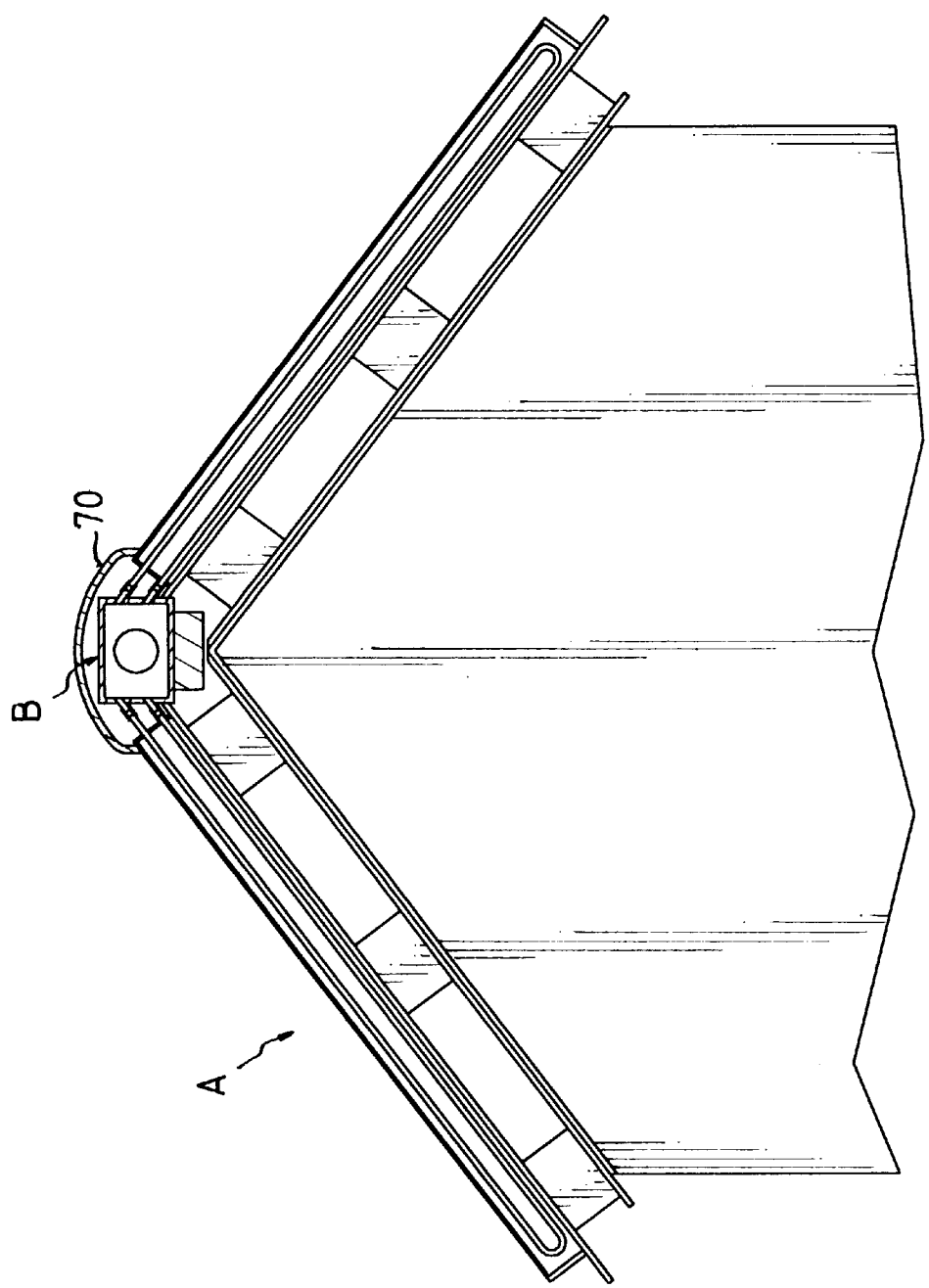
FIG. 6 is a side elevational view, partly in section, of two sets of concentrating solar collectors which are connected with the heat exchanging means.
Figure 7:
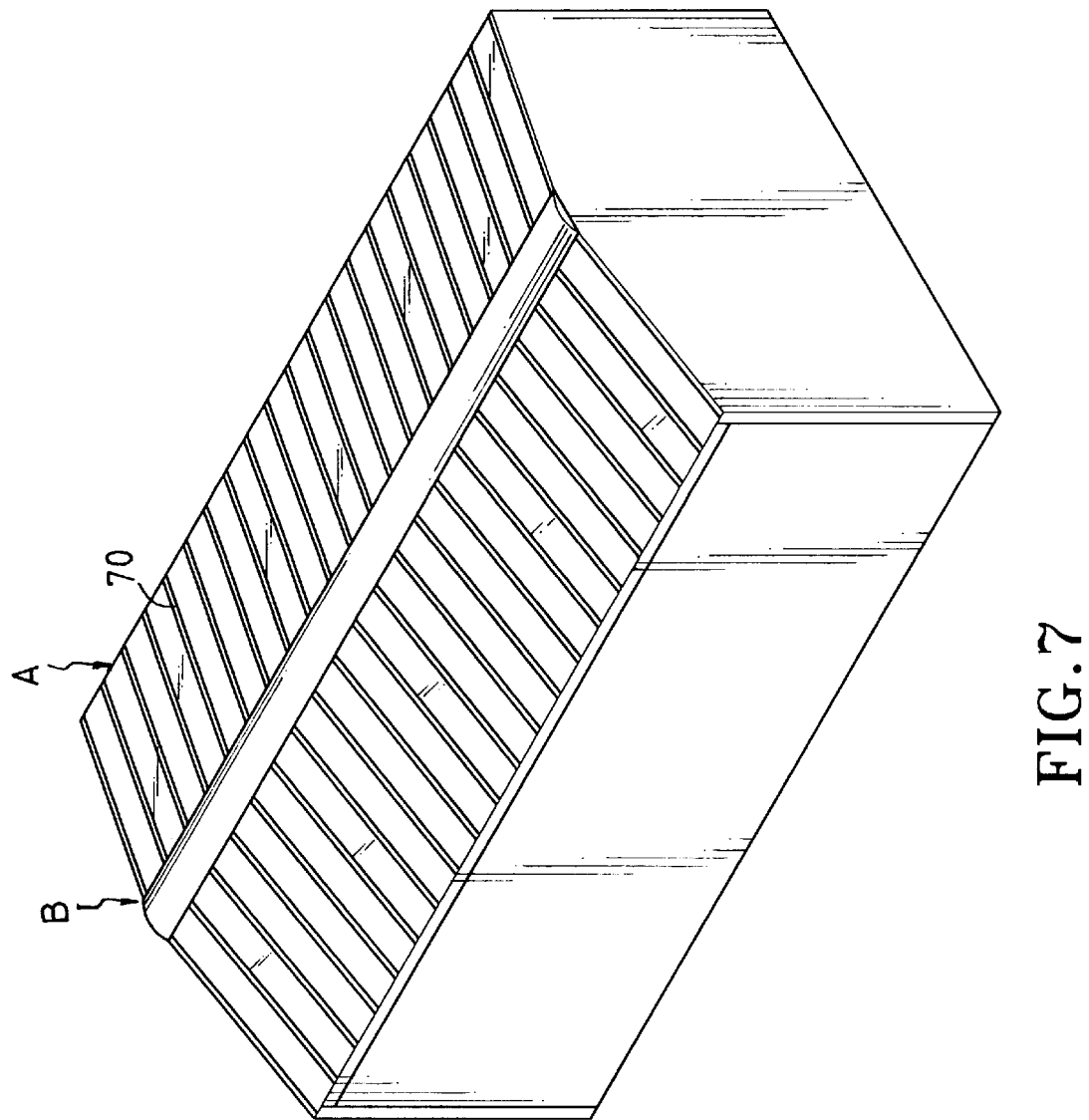
FIG. 7 is a perspective view of a house with the solar power system in accordance with the present invention attached to the top thereof.
Figure 8:
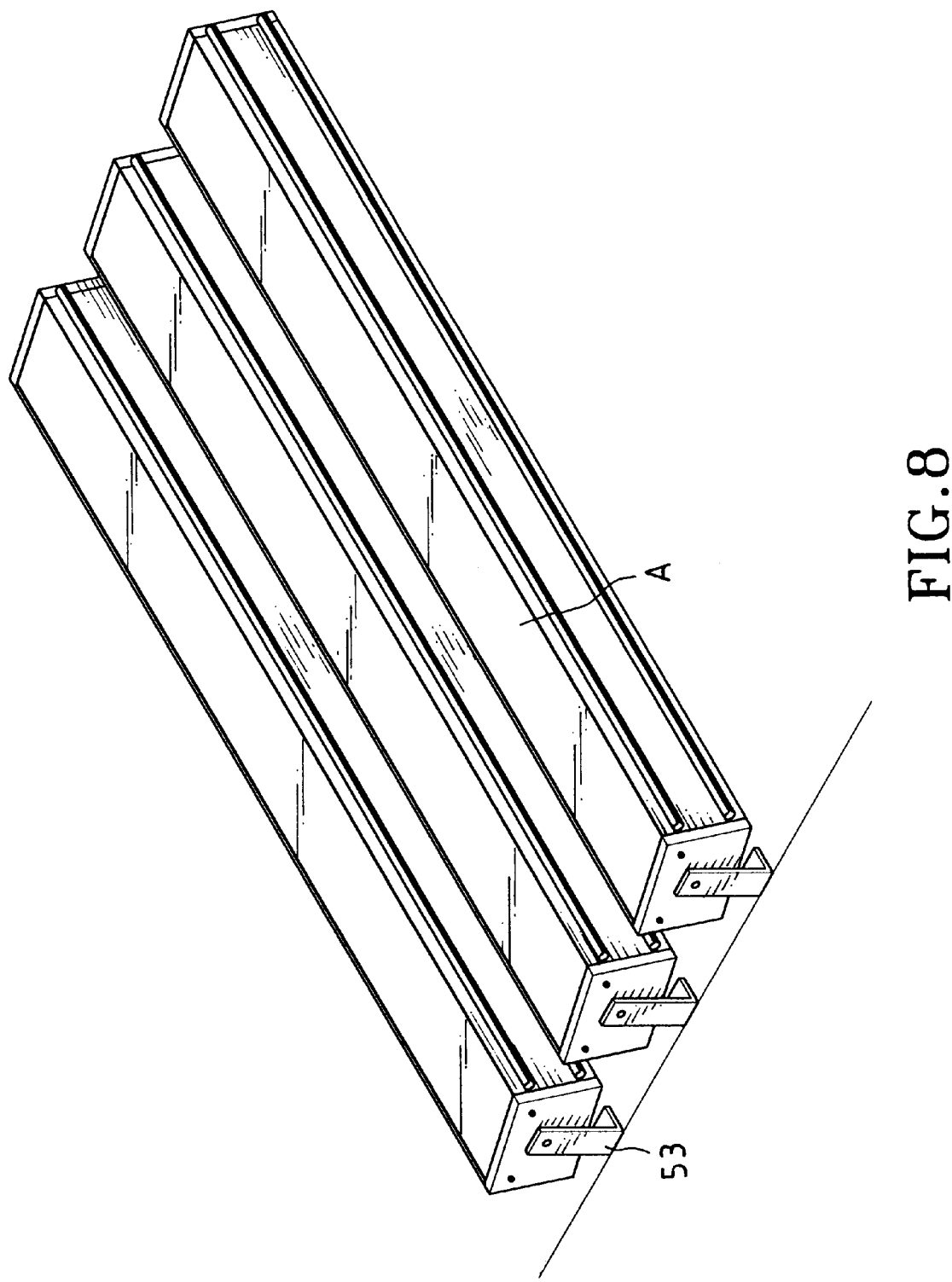
FIG. 8 is a perspective view to show each of the concentrating solar collectors in accordance with the present invention which can be respectively supported by a frame.

Referring back to FIGS. 2 and 4, two connecting members 60 are respectively connected between two engaging members 14 of the two concentrating solar collectors "A", as shown in FIG. 4. One bolt 71 extends through the bridge member 70 and threadedly engages the connecting plate 60. The other bolt 71' extends through the other connecting plate 60 and threadedly engages the top of house 90. Each of the connecting plates 60 has two curved edges 600 which are respectively engaged with the two C-shaped engaging members 14. The concentrating solar collector "A" on each one of the two ends of a series of concentrating solar collectors "A" employs an upper fixing member 73 to be connected between the lens means and the engaging member 14 adjacent to the lens means, and a lower fixing member 62 fixedly connected between the top of the house 90 and the adjacent engaging member 14. The upper fixing member 73 has a top edge 731 to press on the upper transparent plate 40 and the bolt 732 extends through the top edge 731 and contacts the upper transparent plate 40. The lower fixing member 62 has one end 620 thereof engaged with the engaging member 14 and the other end thereof fixedly connected to the top of the house 90 by a bolt 61. FIGS. 6 and 7 show that the concentrating solar collectors "A" can be connected with each other by the way mentioned above and the heat exchanging means "B" is connected between the two respective higher ends of the two series of the concentrating solar collectors "A". FIG. 8 shows that each of the concentrating solar collectors "A" may be pivotally supported by two supporting frames 53 supported at two ends thereof so as to respectively adjust an angle relative to the horizontal plane.

Figure 9:
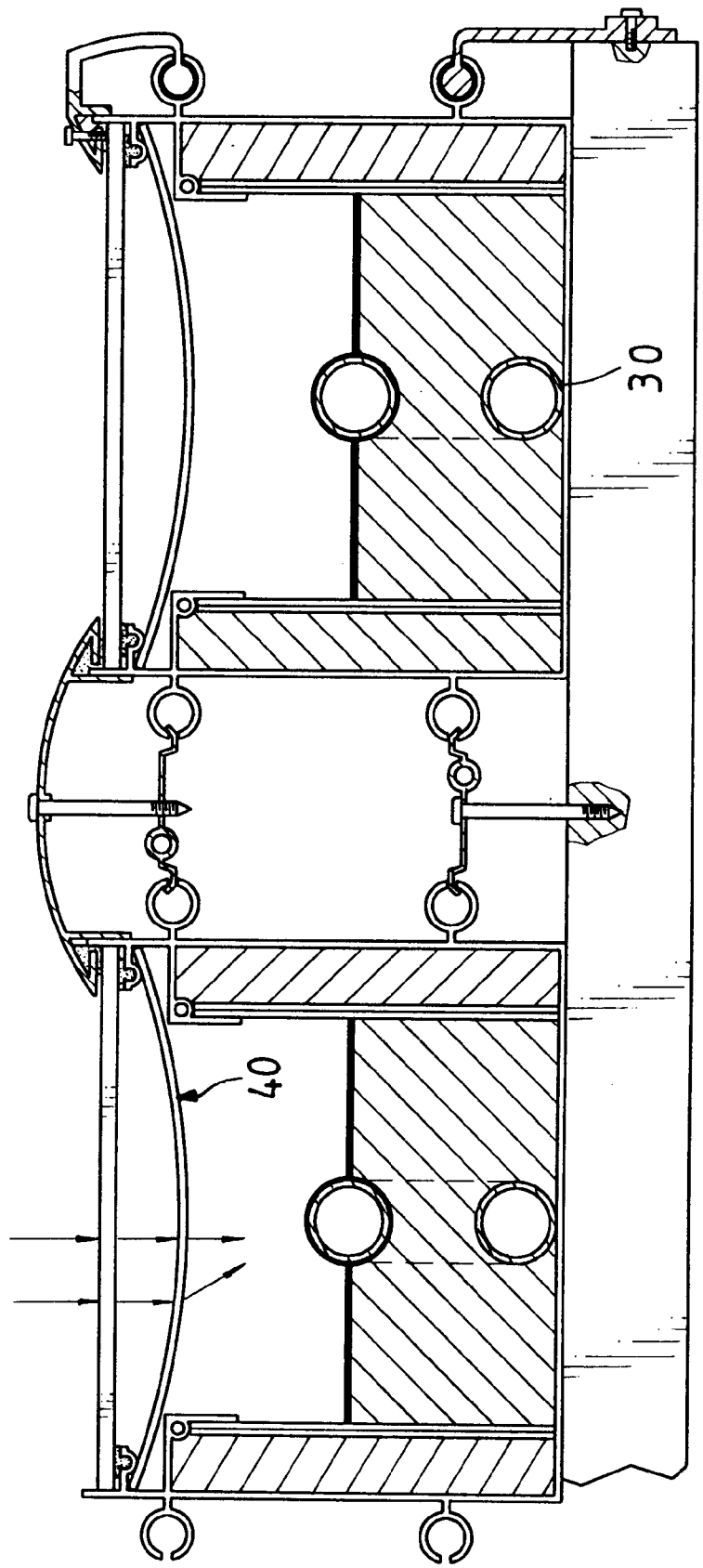
FIG. 9 is a side elevational view, partly in section, of two concentrating solar collectors connected with each other and the lens means is shown as being different from the one shown in FIG. 4.
Figure 10:
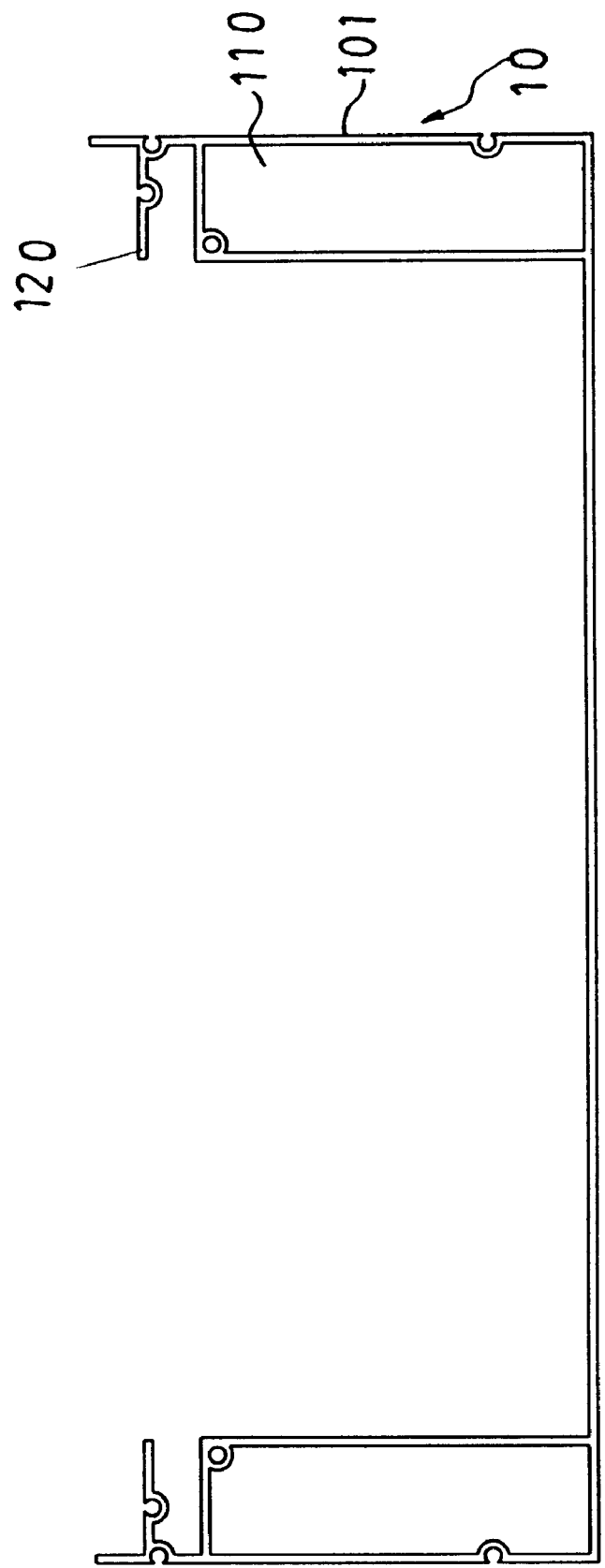
FIG. 10 shows the frame of the concentrating solar collector.
Figure 11:
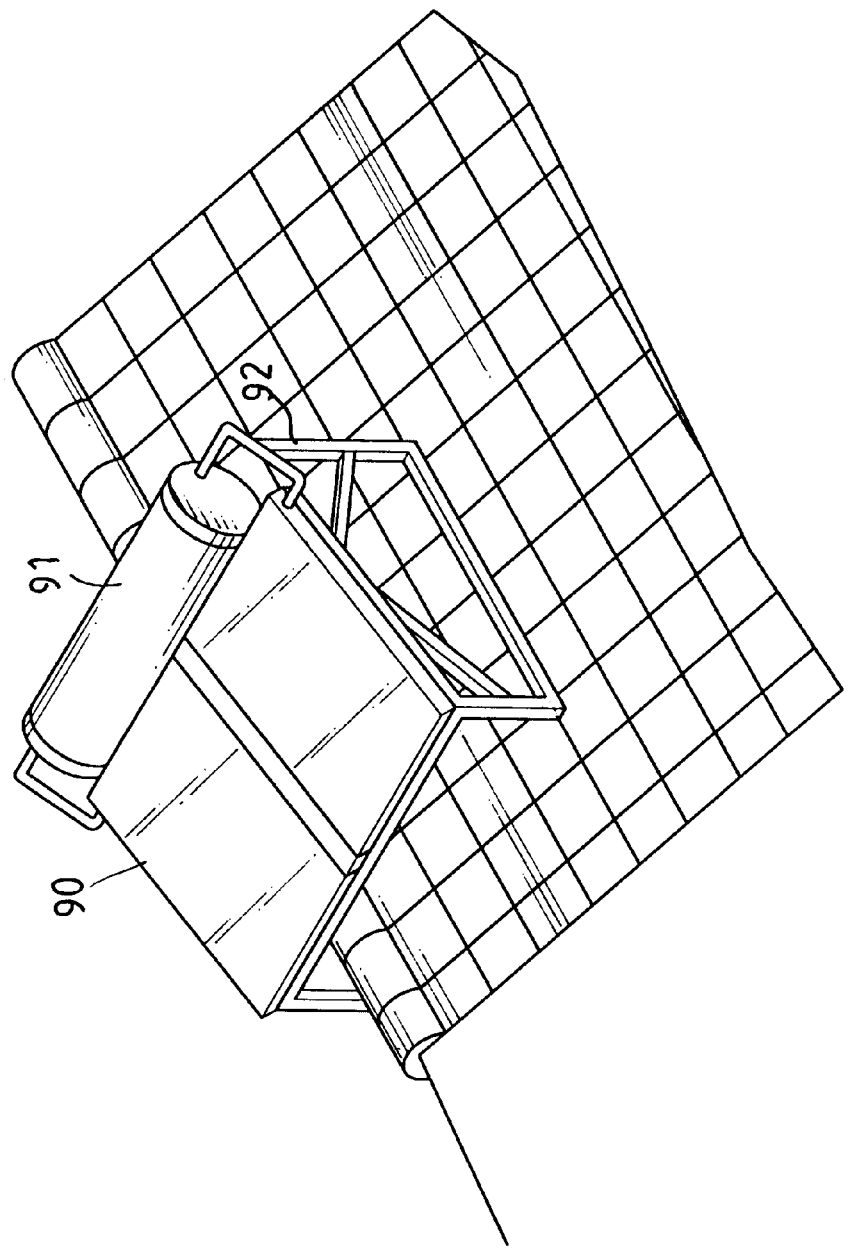
FIG. 11 is an illustrative view showing a conventional solar power system connected to the top of the house.
Figure 12:
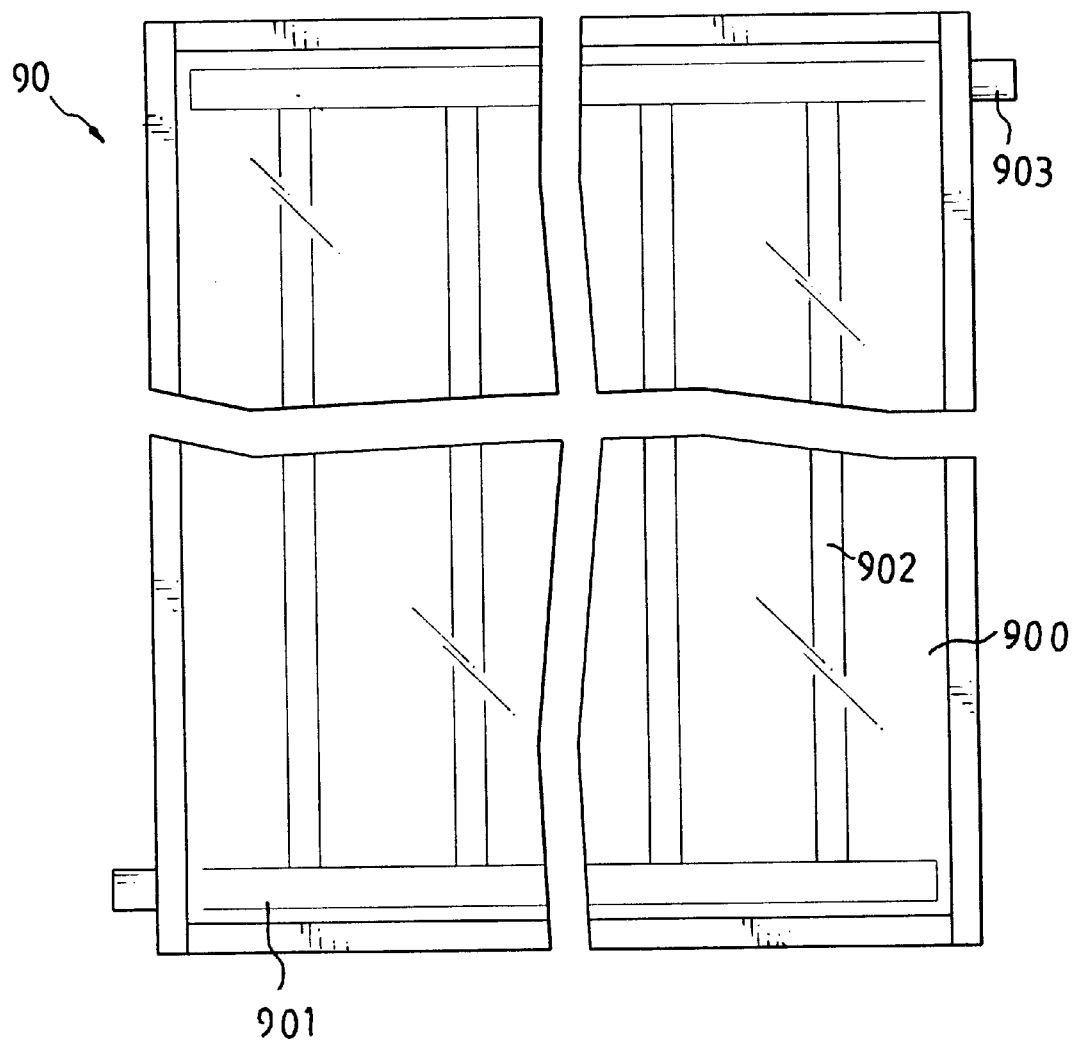
FIG. 12 is an illustrative view showing the structure of the solar panel of the conventional solar power system.
Figure 13:
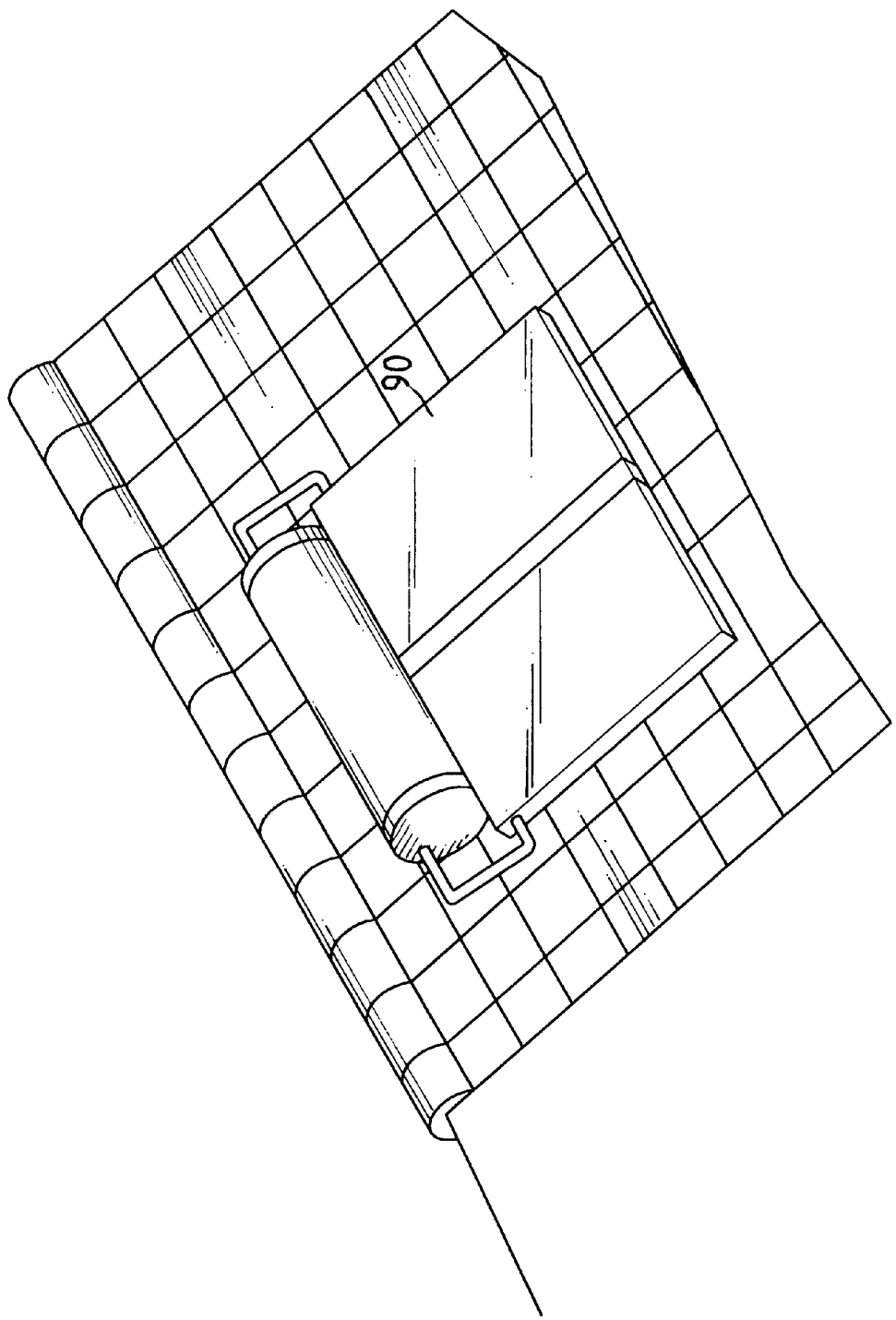
FIG. 13 is an illustrative view showing another type of conventional solar power system on top of the house.

FIG. 9 shows that one of the transparent plates 40 is a transparent concave plate so as to concentrate the sunlight to the circulating tube 30. FIG. 10 shows that the frame 10 can be made by way of aluminum extruding and two receiving passages 110 are defined on the two insides of the side walls 101. Two supporting plates 120 respectively extend from the inside of the two side walls 101 and are located above the two passages 110.

Accordingly, the users can assemble the concentrating solar collectors "A" and the heat exchanging means "B" according to the size he/she needs. Every single one of the concentrating solar collectors "A" is replaceable when it is broken.

While we have shown and described various embodiments in accordance with the present invention, it should be clear to those skilled in the art that further embodiments may be made without departing from the scope and spirit of the present invention.

What is claimed is:

1. A solar power heating system comprising:

a plurality of concentrating solar collectors each comprising a frame having a bottom and two side walls, said two side walls respectively extending from said bottom, each of said two side walls of said frame having an interior wall and a reflecting layer attached to said interior wall;

an isolating block received in said frame and located between said two side walls of said frame, said isolating block having a top surface and a circulating tube engaged within said isolating block, said circulating tube having a section which is exposed from said top surface of said isolating block, said top surface of said isolating block and said section of said circulating tube having an absorbing layer affixed thereto;

lens means connected between said two side walls of said frame for transmission of solar radiation therethrough; and, a heat exchanger connected to each of said plurality of concentrating solar collectors and having an outer tube and an inner tube, said inner tube being adapted to communicate with a supply pipe.

2. The solar power heating system as claimed in claim 1, wherein each of said side walls has a flange extending laterally inward from the inside thereof and an isolating plate retained between each of said side wall and said flange, each of said isolating plates having said reflecting layer attached thereto which faces to said absorbing layer.

3. The solar power heating system as claimed in claim 1, wherein said lens means includes two transparent plates with a gap defined therebetween.

4. The solar power heating system as claimed in claim 3 further comprising two bars connected between said two transparent plates.

5. The solar power heating system as claimed in claim 3, wherein one of said transparent plates is a transparent concave plate.

6. The solar power heating system as claimed in claim 1 further comprising two end boards respectively connected to the two ends of said frame.

7. The solar power heating system as claimed in claim 1, wherein each of said side walls has two engaging members extending outward from the outside thereof.

8. The solar power heating system as claimed in claim 7, wherein each of said engaging members is a C-shaped tubular member.

9. The solar power heating system as claimed in claim 1 further comprising a bridge member which has two ridges extending from the underside thereof and each of said two ridges engaged with the outside of one of said two side walls of said concentrating solar collector.

10. The solar power heating system as claimed in claim 9, wherein said bridge member has a transverse plate extending inwardly from each of the two sides thereof so as to press on said lens means.

11. The solar power heating system as claimed in claim 9, wherein said heat exchanging means has a hole defined in the top thereof and said bridge member has an aperture defined therethrough, a bolt extending through said aperture and engaged with said hole of said heat exchanging means.

* * * * *